United States Patent [19]
Larsson et al.

[11] Patent Number: 6,123,996
[45] Date of Patent: Sep. 26, 2000

[54] COMPOSITION, USE OF A CELLULOSE ETHER AS THICKENING AGENT AND PRODUCTION OF A COATED CELLULOSE-BASED TWO-DIMENSIONAL PRODUCT

[75] Inventors: Kerstin Larsson, Stenungsund, Sweden; Erland Hermansson, Åbo; Dan Eklund, Grankulla, both of Finland; Peter Dahlvik, Stockholm, Sweden

[73] Assignee: Akzo Nobel Surface Chemistry AB, Stenungsund, Sweden

[21] Appl. No.: 09/194,493
[22] PCT Filed: May 23, 1997
[86] PCT No.: PCT/SE97/00847
  § 371 Date: Feb. 23, 1999
  § 102(e) Date: Feb. 23, 1999
[87] PCT Pub. No.: WO97/46757
  PCT Pub. Date: Dec. 11, 1997

[30] Foreign Application Priority Data

Jun. 5, 1996 [SE] Sweden .................................. 9602221

[51] Int. Cl.⁷ .................................. B05D 3/02; B05D 3/12
[52] U.S. Cl. .......................... 427/361; 427/365; 427/391; 427/392; 427/395; 427/396
[58] Field of Search ..................................... 427/361, 365, 427/395, 396, 391, 392

[56] References Cited

U.S. PATENT DOCUMENTS

| 3,931,069 | 1/1976 | Lundin ................................. 260/17 R |
| 4,302,367 | 11/1981 | Cordes et al. ....................... 260/17 R |
| 5,166,332 | 11/1992 | Breckwoldt ............................... 536/84 |

FOREIGN PATENT DOCUMENTS

| 0 425 997 | 5/1991 | European Pat. Off. . |
| 0 496 269 | 7/1992 | European Pat. Off. . |
| 0 651 093 | 5/1995 | European Pat. Off. . |

OTHER PUBLICATIONS

Nilsson et al, Carbohydr. Polym., 28(3), pp. 265–275, 1995.

*Primary Examiner*—Erma Cameron
*Attorney, Agent, or Firm*—Ralph J. Mancini

[57] ABSTRACT

The present invention relates to an aqueous composition for coating, such as sizing or application of a layer of a coating slip, of cellulose-based two-dimensional products. The composition has improved properties at increased temperatures and at high shear rates. These properties are achieved by using as a thickening agent a cellulose ether which is substituted with hydroxyalkyl groups, such as hydroxyethyl and hydroxypropyl, and alkyl groups having 1–3 carbon atoms, and which has a cloud point in the range from 35 C. to 80 C.

11 Claims, No Drawings

COMPOSITION, USE OF A CELLULOSE ETHER AS THICKENING AGENT AND PRODUCTION OF A COATED CELLULOSE-BASED TWO-DIMENSIONAL PRODUCT

This application is the national stage of International Application No. PCT/SE97/00847, filed May 23, 1997.

FIELD OF THE INVENTION

The present invention relates to an aqueous composition for coating, such as surface sizing or application of a layer of a coating slip, of cellulose-based two-dimensional products. The composition has improved properties at increased temperatures and at high shear rates. These properties are achieved by using as thickening agent a cellulose ether, which is substituted with hydroxyalkyl groups, such as hydroxyethyl and hydroxypropyl, and alkyl groups having 1–3 carbon atoms.

BACKGROUND OF THE INVENTION

In coating, such as application of a layer of a coating slip or surface sizing of cellulose-based two-dimensional products, such as paper or cardboard, with a composition, the primary object is to change the properties of the paper product, such as improved strength, improved appearance, improved printability, improved impermeability or improved adhesion properties. Thus, it is common to surface-size paper or cardboard with an aqueous binder-containing composition for improving, inter alia, the wet strength, or to coat paper or cardboard with a composition, which contains pigment pastes, for improving the printability and the appearance of the surface. The coating slip compositions can, in addition to binder and pigments, also contain secondary binders (co-binders), protective colloids, thickening agents and dispersing agents. As thickening agent, protective colloid or secondary binder it is common to add water-soluble or water-swellable polymers based on polyvinyl alcohol, modified celluloses, starch, casein, alginate or high-molecular carboxyl-group-containing polymerisates.

The use of cellulose ethers in coating slips is disclosed in e.g. EP 15 517, where carboxymethylcellulose is added as a secondary binder. From EP 307 795 it is known to use as protective colloid, inter alia, methyl cellulose. EP 425 997 discloses that hydrophobically modified alkylcellulose, alkylhydroxyalkylcellulose or hydroxyalkylcellulose can be used as thickening agent in aqueous paper coating compositions. The hydrophobing groups are preferably $C_{12-16}$-alkyl groups or alkylaryl groups. When used in coating slip compositions, these cellulose ethers result in an improved viscosity at high shear rates, compared with carboxymethylcellulose ethers. Even if paper coating slip compositions according to EP 425 997 result in paper coating slip compositions having properties that in some respects are better than those of carboxymethylcellulose, they also have certain limitations. Thus, they give a comparatively low viscosity at the increased temperatures prevailing when drying the compositions.

From EP 496 269 it is also known to produce, for the coating of paper, a multipolysaccharide-containing suspension, which contains a low molecular polysaccharide, which is dissolved in the aqueous phase and which can be a carboxymethylcellulose or a hydroxyethylcellulose. Moreover, the coating composition contains one or more dispersed, i.e. not dissolved, cellulose polymers, such as hydroxypropylcellulose, methylcellulose, methylhydroxypropylcellulose and hydrophobically modified hydroxyethylcellulose.

The present invention generally relates to an aqueous composition for coating a cellulose-based two-dimensional product containing a binder, wherein said composition contains a water-soluble nonionic alkylhydroxy-alkylcellulose, which contains alkyl groups having 1–3 carbon atoms and hydroxyalkyl groups having 2–3 carbon atoms, but which is free from hydrophobically modified hydrocarbon groups having at least 4 carbon atoms, the alkylhydroxy-alkylcellulose having a cloud point in the range from 35 to 80° C.

According to the present invention, it has now been found that compositions for coating, such as application of a layer of a coating slip or surface sizing, of cellulosebased products, such as paper and board, with improved properties in respect of viscosities at increased temperatures and at high shear rates can be obtained if use is made as thickening agent of a water-soluble, nonionic alkylhydroxyalkylcellulose, which contains alkyl groups having 1–3 carbon atoms and hydroxyalkyl groups containing 2–3 carbon atoms, but which is free from hydrophobically modifying hydrocarbon groups having at least 4 carbon atoms, the cellulose ether having a cloud point in the range from 35 to 80° C. preferably from 45 to 70° C. The alkylhydroxyalkylcellulose thus is dissolved in the composition and its viscosity can vary within wide ranges, such as from 5 mPa·s to 150,000 mPa·s, but usually is 10—10,000 mPa·s in 2% aqueous solution at 20° C.

Compositions that are produced while using the above-described cellulose ethers as thickening agent have a low viscosity at high shear rates and a low tendency to splash, which makes them suitable to apply on two-dimensional cellulose products, such as paper and board. The viscosity increase which arises in the composition when the coated cellulose product is heated during the drying stage, stabilises and immobilises the applied layer and facilitates the subsequent treatment. Despite the increasing viscosity, the inventive compositions have as good dewatering or even more rapid dewatering than compositions containing other types of cellulose ethers and not having the same viscosity increase at an increased temperature.

Typical cellulose ethers for use in compositions according to the invention are ethylhydroxyethylcellulose, methylethylhydroxyethylcellulose, methylethylhydroxyethylhydroxypropylcellulose and methylhydroxypropylcellulose. As a rule, the hydroxyethyl groups constitute at least 30% of the total number of hydroxyalkyl groups, and the number of ethyl substituents usually constitutes at least 10% of the total number of alkyl substituents. Examples of such cellulose ethers are ethylhydroxyethylcellulose with $DS_{ethyl}$=0.8–1.3 and $MS_{hydroxyethyl}$=1.9–2.9 and methylethylhydroxyethylcellulose with $DS_{methyl}$=1.0–2.5; $DS_{ethyl}$=0.1–0.6 and $MS_{hydroxyethyl}$=0.1–0.8. The amount of alkylhydroxyalkylcellulose usually is from 0.05 to 3, preferably from 0.2 to 1.5% by weight of the composition. The cellulose ethers can be produced in conventional manner by reacting mercerised cellulose with ethylene oxide and/or propylene oxide and methylchloride, ethylchloride and/or propylchloride.

The water-based compositions according to the invention suitably contain a binder in an amount 2–70, preferably 5–30% by weight. The binder may consist both of water-soluble binders and of binders in the form of water dispersions or latex. Examples of suitable binders are copolymerisates of ethylenically unsaturated carboxylic acids, starch, proteins, casein and carboxymethylcellulose. Examples of suitable copolymerisates are those made up of monomers from the group of esters of acrylic acid and methacrylic acid, acrylonitrile, methacrylonitrile, acrylamide, methacrylamide, $C_3$–$C_5$ ethylenically unsaturated monocarboxylic acids, ethylenically unsaturated dicarboxylic acids and their semi-esters, vinylchloride, ethylenically unsaturated hydrocarbons, vinyl ester, vinyl sulphonic acid and esters of unsaturated carboxylic acids which are derived from multivalent alcohols. When the compositions are to be used for surface sizing of cellulose-based two-dimensional products, they also contain 5–65% by weight size, based on the dry solids content of the composition. Examples of suitable sizes are different types of colophonium, sulphate resin, protein complex, polyethylene wax dispersions, paraffin copolymers, melamine-formaldehyde resins etc.

The compositions may also contain pigments, which may consist of naturally derived inorganic pigments as well as synthetically produced pigments. Examples of pigments are kaolin, calcium carbonate, talc, titanium dioxide, satin white, hydratised aluminium, sodium silicoaluminate and plastic pigments and a large number of special pigments, such as barium sulphate and zinc oxide. In a pigment coating slip composition, the content of pigments usually is 5–65% by weight and constitutes 4 to 20 times the amount of binder.

A typical coating slip composition according to the invention is composed as follows, based on its dry solids content.

0.07–5, preferably 0.3–2% by weight alkylhydroxyalkylcellulose as defined

5–15, preferably 7–13% by weight latex,

60–94, preferably 70–90% by weight pigment,

0–10, preferably 0–7% by weight secondary binder,

0–3, preferably 0.1–2% by weight dispersing agent,

0–5, preferably 0–2% by weight protective colloid,

0–4, preferably 0–2% by weight other additives, such as fluorescent whitening agents, bactericides, antifoaming agents and lubricants, the dry solids content being from 20 to 70% by weight. The Brookfield viscosity of the coating slip composition normally is from 100 to 2,500 mPa·s at 100 rpm and 20° C. The viscosity of coating slip compositions having a dry solids content from 55 to 70% by weight is from 600 to 2500 mPa·s. An aqueous coating slip composition according to the invention can be produced by dispersing a pigment in water, optionally with the aid of a dispersing agent. The resulting slip can then be supplied with water-soluble binders included in the composition, alkylhydroxyalkylcellulose and other additives and, finally, optional binder dispersions such as latex.

A cellulose-based product coated with a composition according to the invention can be produced by a) applying a composition according to the invention at a temperature below the cloud point of the alkylhydroxyalkylcellulose to the cellulose-based product, b) drying the two-dimensional cellulose product coated with the composition during heating, and c) if desired, calendering said cellulose product.

The application of the composition takes place in a manner known per se, for instance by air knife coating, roll coating or blade coating. Usually, at least 90% of the drying takes place at a temperature range which to at least 60%, preferably completely, falls below the cloud temperature of the alkylhydroxyalkylcellulose. Depending on the season and the geographic position, the temperature of the composition in application usually is in the range of 5–30, preferably 10–25° C.

The invention is further illustrated by the following examples.

EXAMPLE 1

A number of aqueous coating slip compositions with a dry solids content of 60% by weight and intended for coating of paper were produced, based on the following recipe.

100 parts by weight kaolin 10 parts by weight styrene-butadiene latex 0.11 parts by weight sodium acrylate 0.6–1.1 parts by weight cellulose ether (the amount adjusted to give the composition a viscosity according to Brookfield 100 of about 1100 mPa·s)

balance water to a dry solids content of 60% by weight.

The following cellulose ethers were used. All viscosities concern the viscosity in a 2% aqueous solution at 20° C.

| Designation | Cellulose ether |
|---|---|
| A | ethylhydroxyethylcellulose which had been hydrophobically modified with nonyl phenyl groups, cloud point 52° C., viscosity 7,500 mPa•s |
| B | cellulose ether according to A, whose chain had been shortened, cloud point 57° C., viscosity 460° mpa•s |
| C | carboxymethylcellulose, viscosity 10 mPa•s, (FINNFIX 10) |
| D | hydroxyethylcellulose, viscosity 8,000 mPa•s |
| E | hydroxyethylcellulose, viscosity 400 mpa•s |
| I | methylethylhydroxyethylcellulose, cloud point 65° C., viscosity 1,230 mPa•s |
| II | ethylhydroxyethylcellulose, cloud point 65° C., viscosity 300 mPa•s |
| III | ethylhydroxyethylcellulose, cloud point 69° C., viscosity 5,000 mPa•s |
| IV | ethylhydroxyethylcellulose, cloud point 69° C., viscosity 10,000 mPa•s |
| V | ethylhydroxyethylcellulose, cloud point 69° C., viscosity 80,000 mpa•s |
| VI | methylhydroxypropylcellulose, cloud point 57° C., viscosity 400 mPa•s |

The various compositions were heated and their viscosities were measured. The following results were obtained.

| | | Bohlin CS-viscosity 4 $s^{-1}$, mPa•s | | | |
|---|---|---|---|---|---|
| Test | Ether | 30° C. | 40° C. | 50° C. | 60° C. |
| A | A | 4460 | 4337 | 4871 | 4093 |
| B | B | 2748 | 3199 | 3833 | 3136 |
| C | C | 4667 | 4744 | 4908 | 5124 |
| D | D | 3830 | 3795 | 3779 | 3639 |
| E | E | 5804 | 5692 | 5412 | 4800 |
| 1 | I | 3621 | 4531 | 6094 | 5903 |
| 2 | II | 4572 | 6250 | 7855 | 7047 |
| 3 | III | 4186 | 5045 | 7398 | 7368 |
| 4 | IV | 4702 | 5390 | 6888 | 6190 |
| 5 | V | 5480 | 6110 | 6550 | 6750 |
| 6 | VI | 3860 | 4290 | 4920 | 4820 |

As appears from the results, the viscosity of the coating slip compositions according to the invention, after application, increased as the temperature was increased, whereas the coating slip compositions produced according to prior-art technique presented merely insignificant viscosity increases or even considerable viscosity decreases.

EXAMPLE 2

A number of coating slip compositions having a dry solids content of 65% by weight, intended for the coating of paper, were produced based on the following recipe.

| | |
|---|---|
| 100 parts by weight | calcium carbonate |
| 10 parts by weight | styrene-butadiene latex |
| 0.6–1.1 parts by weight | cellulose ether (the amount adjusted to give a viscosity according to Brookfield 100 of about 1100 mPa•s) |
| balance | water |

The type of cellulose ether appears from the following Table. The various compositions were heated and their viscosity was measured. The following results were obtained.

| | | Bohlin CS-viscosity 4 s$^{-1}$, mPa•s | | | |
|---|---|---|---|---|---|
| Test | Ether | 30° C. | 40° C. | 50° C. | 60° C. |
| F | A | 3449 | 3389 | 3865 | 4919 |
| G | C | 3030 | 3011 | 3053 | 3220 |
| H | E | 3101 | 2891 | 2802 | 2714 |
| 6 | I | 3254 | 3339 | 3730 | 5630 |
| 7 | II | 2572 | 2903 | 4222 | 7224 |

As appears from the results, the compositions according to the invention had a better development of the viscosity when increasing the temperature than that of the comparison compositions.

EXAMPLE 3

Three different coating slip compositions having a dry solids content of 65% by weight and a viscosity (Brookfield 100) of about 1,500 mPa·s were produced. They were composed as follows.

| | Formulation, parts by weight | | |
|---|---|---|---|
| Ingredient | 1 | 2 | 3 |
| Calcium carbonate | 80 | 80 | 80 |
| Kaolin | 20 | 20 | 20 |
| Latex, styrene-butadiene | 10 | 10 | 10 |
| Cellulose ether, type A | 0.4 | — | — |
| Cellulose ether, type C | — | 0.65 | — |
| Cellulose ether, type I | — | — | 0.45 |
| Water | balance | balance | balance |

A composition in an amount of 24 g was weighed in thin-walled aluminium dishes and were levelled such that the surfaces, through which evaporation of water could take place, were of the same size. The various samples were then dried in a heating cabinet at 105° C. and the change in weight was measured every 15th minute. The evaporation of water at the time 0 was determined as the average evaporation of water during the first 15 min of heating of the composition from 25° C. to the final temperature 105° C. The following results were obtained.

| | Drying rate, g H$_2$O/min, time | | | |
|---|---|---|---|---|
| Formulation | 0 | 15 | 30 | 60 |
| 1 | 0.033 | 0.045 | 0.040 | 0.41 |
| 2 | 0.031 | 0.038 | 0.033 | 0.033 |
| 3 | 0.034 | 0.044 | 0.043 | 0.42 |

From the results appears that the composition according to the invention, which have a higher viscosity than the comparison compositions at higher temperatures, nevertheless have the same evaporation of water or even better.

EXAMPLE 4

Two coating slip compositions having a dry solids content of 65% by weight were produced, having the following composition.

| | Formulation, parts by weight | |
|---|---|---|
| | 1 | 2 |
| Calcium carbonate | 100 | 100 |
| Sodium polyacrylate | 0.025 | 0.025 |
| Cellulose ether C | 0.4 | — |
| Cellulose ether II | — | 0.4 |
| Styrene-butadiene latex | 10 | 10 |

The viscosities of the coating slip compositions were measured at 50° C., 53° C., 56° C., 59° C. and 62° C. according to Bohlin CS 25 s$^{-1}$. The following results were obtained.

| | Viscosity, mPa•s, formulation | |
|---|---|---|
| Temperature, ° C. | 1 | 2 |
| 50 | 380 | 1 250 |
| 53 | 390 | 1 630 |
| 56 | 400 | 2 070 |
| 59 | 410 | 2 330 |
| 62 | 420 | 2 290 |

From the results appears that the viscosity increase at the elevated temperatures was essentially higher for the coating slip composition according to the invention than for the comparison composition.

What is claimed is:

1. A method of coating a cellulose-based two-dimensional products which comprises applying to the surface of said product an aqueous coating composition containing a thickening agent, wherein said thickening agent comprises a water-soluble nonionic alkyhydroxyalkyl-cellulose ether, which contains alkyl groups having 1–3 carbon atoms and hydroxyalkyl groups having 2–3 carbon atoms, but which is free from hydrophobically modified hydrocarbon groups having at least 4 carbon atoms, the cellulose ether having a cloud temperature in the range from 35 to 80° C.

2. The method of claim 1, wherein the cellulose ether consists of an ethylhydroxyethylcellulose.

3. The method of claim 1, wherein the cellulose ether consists of a methylethylhydroxyethylcellulose.

4. The method of claim 1 wherein the cellulose ether has a cloud point in the range from 45 to 70°, and a viscosity of 10–10,000 mPa·s in a 2% aqueous solution at 20° C.

5. An aqueous composition for coating a cellulose-based two-dimensional product containing a binder, said composition comprising a water-soluble nonionic alkylhydroxyalkylcellulose, which contains alkyl groups having 1–3 carbon atoms and hydroxyalkyl groups having 2–3 carbon atoms, but which is free from hydrophobically modified hydrocarbon groups having at least 4 carbon atoms, the alkylhydroxyalkylcellulose having a cloud point in the range from 35 to 80° C.

6. The composition of claim 5 for application of a layer of a coating slip which comprises 0.05–3% by weight of the water-soluble nonionic alkylhydroxyalkylcellulose, 5–30% by weight binder, and 5–65% by weight pigment the composition having a Brookfield viscosity from 100 to 2,500 mPa·s and a dry solids content from 20 to 70% by weight.

7. The composition of claim 6 which comprises, based on the dry solids content, the following ingredients 0.05–5% by weight of the water-soluble nonionic alkylhydroxyalkylcellulose 7–13% by weight latex, 0–7% by weight secondary binder, 0.1–2% by weight dispersing agent, 0–2% by weight protective colloid, and 70–90% by weight pigment.

8. The composition of claim 7 wherein the composition has a dry solid content of 55–70% by weight, and wherein the latex consists at least partially of a styrenebutadiene latex or an acrylate latex, and that the pigment consists at least partially of calcium carbonate or kaolin.

9. The composition of claim 5 wherein the alkylhydroxyalkylcellulose is a methylethylhydroxyethylcellulose or an ethylhydroxyethylcellulose having a cloud point in the range from 45 to 70° C. and a viscosity of 10–10,000 mPa·s measured in a 2% solution at a temperature of 20° C.

10. A method for producing a coated cellulose-based two-dimensional product which comprises applying a) an aqueous composition according to claim 5 to the cellulose-based two-dimensional product at a temperature below the cloud temperature of the alkylhydroxyalkylcellulose, and b) and thereafter drying the cellulose-based product.

11. The method of claim 10 wherein said cellulose-based product is calendered.

* * * * *